(12) United States Patent
Gao et al.

(10) Patent No.: US 11,099,954 B2
(45) Date of Patent: Aug. 24, 2021

(54) METHOD, DEVICE, AND COMPUTER PROGRAM PRODUCT FOR REBUILDING DATA

(71) Applicant: EMC IP Holding Company LLC, Hopkinton, MA (US)

(72) Inventors: Wei Gao, Shanghai (CN); Ao Sun, Shanghai (CN); Yu Teng, Shanghai (CN); Jialei Wu, Shanghai (CN); Chunxi Cheng, Shanghai (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 5 days.

(21) Appl. No.: 16/655,382

(22) Filed: Oct. 17, 2019

(65) Prior Publication Data

US 2020/0133811 A1 Apr. 30, 2020

(30) Foreign Application Priority Data

Oct. 31, 2018 (CN) .......................... 201811289051.5

(51) Int. Cl.
*G06F 11/20* (2006.01)

(52) U.S. Cl.
CPC ...... *G06F 11/2094* (2013.01); *G06F 2201/82* (2013.01)

(58) Field of Classification Search
CPC .................................................. G06F 11/2094
USPC .................................................. 714/6.3, 6.32
See application file for complete search history.

(56) References Cited

U.S. PATENT DOCUMENTS

| | | | |
|---|---|---|---|
| 7,472,223 B1 * | 12/2008 | Ofer .................... | G06F 11/1662 711/112 |
| 8,782,245 B1 | 7/2014 | Glade et al. | |
| 8,856,589 B1 | 10/2014 | Glade et al. | |
| 9,311,001 B1 | 4/2016 | Glade et al. | |
| 9,417,812 B1 | 8/2016 | Palekar et al. | |
| 10,095,585 B1 * | 10/2018 | Proulx ............... | G06F 11/1088 |
| 10,254,970 B1 | 4/2019 | Martin et al. | |
| 10,275,312 B1 * | 4/2019 | Barhate ............... | G06F 11/1088 |
| 2009/0150599 A1 * | 6/2009 | Bennett ............... | G06F 11/1471 711/103 |

(Continued)

OTHER PUBLICATIONS

"RAID", Prepressure.com, https://www.prepressure.com/library/technology/raid, Apr. 11, 2015 (Year: 2015).*

*Primary Examiner* — Chae M Ko
(74) *Attorney, Agent, or Firm* — BainwoodHuang

(57) ABSTRACT

Techniques provide for rebuilding data. Such techniques involve: obtaining health status information related to a first disk of a storage system, the first disk being divided into a plurality of disk units, and the health status information indicating a failure of a first disk unit of the plurality of disk units; determining a data block stored in the first disk unit based on a mapping between data blocks for the storage system and storage locations; and rebuilding the data block into a second disk of the storage system when maintaining accessibility of other data blocks in other disk units of the first disk than the first disk unit. Accordingly, it is possible to improve the data rebuilding efficiency when a disk fails partly and to continue utilizing the storage space portion in the disk that is not failed, without making the disk be offline temporarily.

23 Claims, 6 Drawing Sheets

(56) References Cited

U.S. PATENT DOCUMENTS

| | | | |
|---|---|---|---|
| 2014/0164849 A1* | 6/2014 | Floeder | G06F 11/004 714/47.2 |
| 2014/0310483 A1* | 10/2014 | Bennett | G06F 3/0619 711/154 |
| 2014/0325262 A1* | 10/2014 | Cooper | G06F 11/108 714/6.22 |
| 2017/0097875 A1* | 4/2017 | Jess | G06F 11/1092 |
| 2017/0337103 A1* | 11/2017 | Royer, Jr. | G06F 11/108 |
| 2018/0025786 A1* | 1/2018 | Coglitore | G06F 11/0727 360/75 |

* cited by examiner

METHOD, DEVICE, AND COMPUTER PROGRAM PRODUCT FOR REBUILDING DATA

CROSS-REFERENCE TO RELATED APPLICATION

This application claims priority to Chinese Patent Application No. CN201811289051.5, on file at the China National Intellectual Property Administration (CNIPA), having a filing date of Oct. 31, 2018, and having "METHOD, DEVICE, AND COMPUTER PROGRAM PRODUCT FOR REBUILDING DATA" as a title, the contents and teachings of which are herein incorporated by reference in their entirety.

FIELD

The present disclosure generally relates to a storage technology, and more specifically, the present disclosure relates to a method, a device, and a computer program product for rebuilding data.

BACKGROUND

A trend in storage field is that capacity of disk is becoming greater and greater. For example, a current solid state drive (SDD) device provides a storage space of 6 TB or greater, and a hard disk drive (HDD) can even have a storage space of about 60 TB. With the development of technologies, the capacity of disk will keep on increasing. Data rebuilding is an important data protection mechanism in a storage system, involving reading other related data for regenerating damaged data in a failed disk and storing the regenerated data into other healthy disks. With the increasing of the capacity of disk, data rebuilding will costs more computing and memory resources and will take longer time. In a storage system in which different disks are distributed to different physical nodes, the data rebuilding also involves data transmission between different physical nodes and thus occupies certain network resources.

SUMMARY

Embodiments of the present disclosure provide an improved solution for rebuilding data.

In a first aspect of the present disclosure, there is provided a method of rebuilding data. The method includes: obtaining health status information related to a first disk of a storage system, the first disk being divided into a plurality of disk units, the health status information indicating a failure of a first disk unit of the plurality of disk units; determining a data block stored in the first disk unit based on a mapping between data blocks for the storage system and storage locations; and rebuilding the data block into a second disk of the storage system, while maintaining accessibility of other data blocks in other disk units of the first disk than the first disk unit.

In a second aspect of the present disclosure, there is provided an electronic device. The electronic device includes: a processor; and a memory coupled to the processor and having instructions stored therein, the instructions, when executed by the processor, causing the device to perform acts including: obtaining health status information related to a first disk of a storage system, the first disk being divided into a plurality of disk units, and the health status information indicating a failure of a first disk unit of the plurality of disk units; determining a data block stored in the first disk unit based on a mapping between data blocks for the storage system and storage locations; and rebuilding the data block into a second disk of the storage system, while maintaining accessibility of other data blocks in other disk units of the first disk than the first disk unit.

In a third aspect of the present disclosure, there is provided a computer program product being tangibly stored on a computer-readable medium and including computer-executable instructions, which, when executed, cause a device to: obtain health status information related to a first disk of a storage system, the first disk being divided into a plurality of disk units, and the health status information indicating a failure of a first disk unit of the plurality of disk units; determine a data block stored in the first disk unit based on a mapping between data blocks for the storage system and storage locations; and rebuild the data block into a second disk of the storage system, while maintaining accessibility of other data blocks in other disk units of the first disk than the first disk unit.

The Summary is to introduce a selection of concepts in a simplified form that are further described below in the Detailed Description. This Summary is not intended to identify key features or essential features of the present disclosure, nor is it intended to be used to limit the scope of the present disclosure.

BRIEF DESCRIPTION OF THE DRAWINGS

The above and other objectives, advantages and features of the present disclosure will become apparent through the detailed description of example embodiments of the present disclosure with reference to the accompanying drawings, where the same reference symbols generally refer to the same elements in the example embodiments of the present disclosure.

DETAILED DESCRIPTION OF EMBODIMENTS

Figure 1:
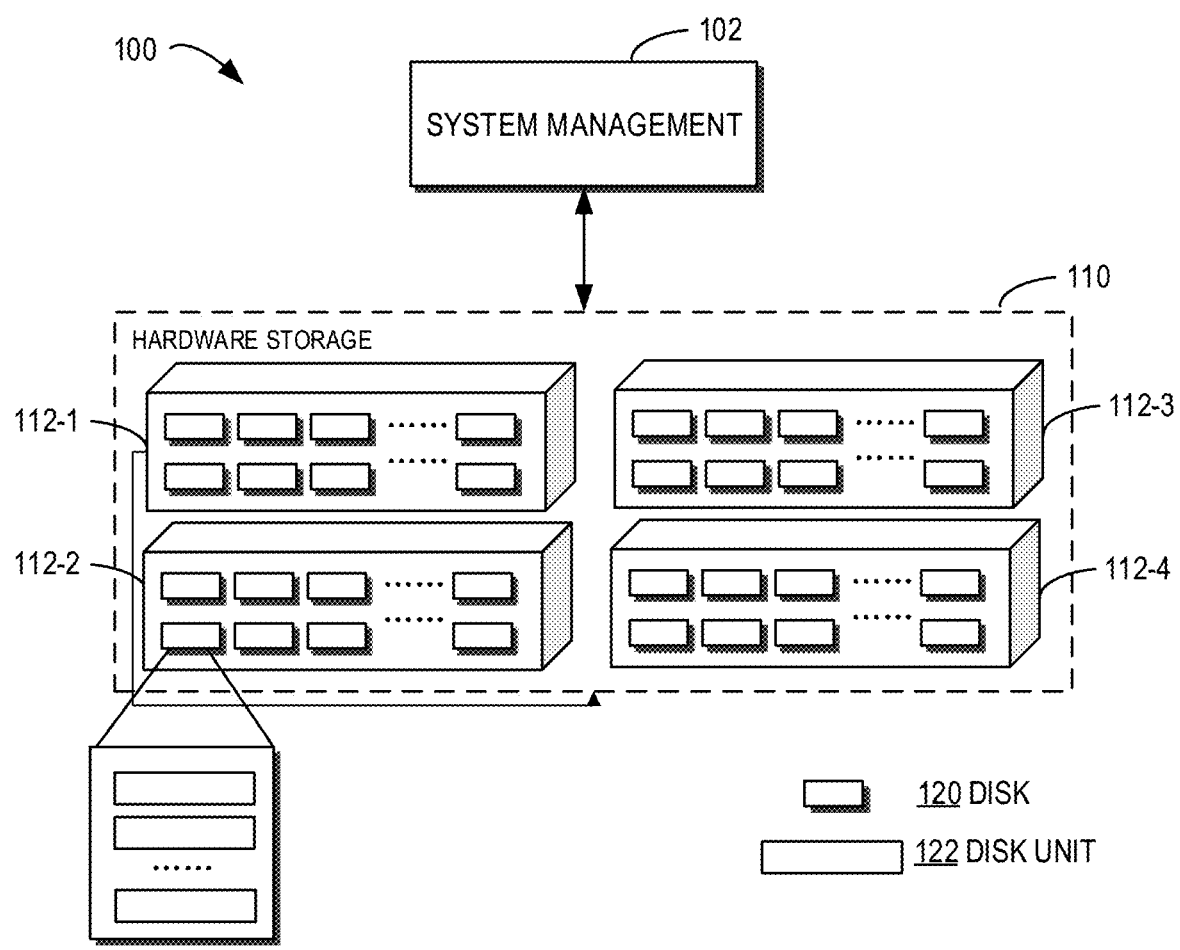
FIG. 1 illustrates a schematic block diagram of a storage system in which some embodiments of the present disclosure can be implemented.

The individual features of the various embodiments, examples, and implementations disclosed within this document can be combined in any desired manner that makes technological sense. Furthermore, the individual features are hereby combined in this manner to form all possible combinations, permutations and variants except to the extent that such combinations, permutations and/or variants have been explicitly excluded or are impractical. Support for such combinations, permutations and variants is considered to exist within this document.

It should be understood that the specialized circuitry that performs one or more of the various operations disclosed herein may be formed by one or more processors operating in accordance with specialized instructions persistently stored in memory. Such components may be arranged in a variety of ways such as tightly coupled with each other (e.g., where the components electronically communicate over a computer bus), distributed among different locations (e.g., where the components electronically communicate over a computer network), combinations thereof, and so on.

Principles of the present disclosure will now be described with reference to several example embodiments illustrated in the drawings. Although some preferred embodiments of the present disclosure are shown in the drawings, it would be appreciated that description of those embodiments is merely for the purpose of enabling those skilled in the art to better understand and further implement the present disclosure and is not intended for limiting the scope disclosed herein in any manner.

As used herein, the term "includes" and its variants are to be read as open-ended terms that mean "includes, but is not limited to." The term "or" is to be read as "and/or" unless the context clearly indicates otherwise. The term "based on" is to be read as "based at least in part on." The term "one example embodiment" and "an embodiment" are to be read as "at least one example embodiment." The term "another embodiment" is to be read as "at least one further embodiment." The term "first," "second" or the like may represent different or the same objects. Other definitions, either explicit or implicit, may be included below.

FIG. 1 illustrates a schematic block diagram of a storage system 100 in which some embodiments of the present disclosure can be implemented. The storage system 100 includes a system management module 102 and a hardware storage portion 110. The hardware storage portion 110 includes a plurality of physical nodes 112-1, 112-2, 112-3 and 112-4 (which is referred to as physical node 112 collectively or individually, for convenience of description). Each physical node 112 is equipped with one or more disks 120 for providing respective storage spaces. Different physical nodes 112 may be distributed at one or more different geological locations, and may communicate with the system management module 102 or with other physical nodes via networks. The storage system 100 with such node distribution may be referred to as a distributed storage system.

The system management module 102 is used for managing operations of the whole storage system, including, but not limited to, allocation of the storage space of the disk 120, input/output (I/O) access of the disk 120, disk failure processing, data protection and the like. The system management module 102 may be implemented at a computer device or server, or distributed over a plurality of computing devices or servers. In some implementations, according to clients' needs, the system management module 102 may allocate storage space in the hardware storage portion 110 to the respective client or recycle the allocated storage space. The client may use the allocated storage space, without knowledge of actual locations of physical storage disks. This kind of storage system sometimes may be referred to as elastic cloud storage (ECS).

The disk 120 in the storage system 100 may be a disk of any type that can provide data storage space. Some examples of the disk 120 include, but are not limited to, a solid state drive (SSD), a hard disk drive (HDD), a serial advanced technology attachment (SATA) disk, a serially attached (SA) small computer system interface (SCSI) disk, a SAS disk and the like. The disk capacity of the disk 120 may be of any size. In some implementations, in particular in implementations where the disk 120 has a large capacity, for convenience of management, one disk 120 may be divided into a plurality of disk units 122, as shown in FIG. 1. The plurality of disk units 122 may be of the same size. According to different types of disks, different disk units may occupy different disk sizes. For example, a HDD disk can be divided into disk units per HDD head, which may also be referred to as disk platters. An SSD disk may be divided per disk channel, in which different disk channels correspond to different disk units. Other types of disks may be divided into disk units in other manners.

It would be appreciated that, although a specific number of physical nodes and a specific number of disk units are shown in FIG. 1; the storage system 110 may also include more or fewer physical nodes. Different number of disks may be provided on each node, and each disk may be divided into a different number of disk units. The scope of the present disclosure is not limited in this aspect.

In the storage system, node or disk failure occurs from time to time. The disk may fail partly sometimes; for example, one or some disk units therein fail. In some current specifications, a failure indication in disk unit-level has been supported; therefore some disks can report this kind of failure indication. For a failed disk or disk unit, data rebuilding is required to recover data therein, to accomplish the purpose of data protection. In legacy storage space, it is typically required to perform data rebuilding in a unit of disk, and then replace the failed disk with a new one. In a case that a disk only fails partly, unnecessary waste is caused with this method. In particular, for a disk having a large capacity, except the failed disk unit, other disk units can still operate normally, but have to be replaced.

In order to improve hardware utilization rate, there is further provided a solution for extracting data offline. According to this solution, if a part of a disk in the storage system fails (for example, one or some disk units fail); the disk may be plugged out of a respective physical node, causing the disk to go offline temporarily. The data in the disk failed partly (including data stored in the failed disk unit and failure-free disk units) is rebuilt to a further healthy disk in the storage system. With an offline data extraction technology, data of the disk failed partly is completely erased, and the disk failed partly is created as a new disk. The failed part of the disk is not used any longer, and therefore the disk has a smaller storage capacity. The created disk will be reassigned to the storage system. As a new disk, the storage system may continue to use failure-free storage capacity in the disk. This solution enables reuse of the available storage space in the disk failed partly, thereby reducing the costs.

However, efficiency of the offline data extraction solution is still low, in particular for a storage system with large capacity and/or a distributed storage system. The reason lies in that it is still required to rebuild all data in the disk failed partly. For example, even though the failed portion of the disk only occupies 10% of the storage capacity, it is still required to rebuild data stored in the entire disk, including data in the failure-free portion. It takes a large amount of computing resources, memory resources of a network or disk, and probably also network resources, to rebuild all data of the entire disk, as a result, response speed of the storage system will be reduced and probably resulting in instability in foreground traffic latency.

A conceivable improved solution includes that only data in the failed portion of the disk are rebuilt, and the remaining portion of the disk may be directly used further, without erasing data therein. However, a mapping between the failed unit of the disk and the data impacted by the failed unit is complicated, particularly in a distributed storage system. A large storage space is needed to store this kind of complicated mapping, thus it cannot be implemented at an operation system (OS) level of a single node because there is no enough space to record the complicated mapping in the kernel of the node. In addition, if the failed portion of the disk is not formatted, it is hard for the storage management level to identify the failed portion of the particular disk, and thus still continues allocating the storage space of the failed portion.

According to embodiments of the present disclosure, there is proposed a solution for rebuilding data. In the solution, data rebuilding is implemented at a system management level. If it is determined that one or more disk units in a disk of a storage system fail, a data block stored in the failed disk units are determined based on a mapping between the data blocks and storage locations. The determined data block is rebuilt to another disk, and the remaining failure-free disk units in the disk with the failed disk unit are still accessible. With this solution, it is possible to improve the data rebuilding efficiency when a disk fails partly and to continue utilizing the storage space portion in the disk that is not failed, without making the disk be offline temporarily.

Embodiments of the present disclosure will be described in detail below with reference to the accompanying figures.

Figure 2:
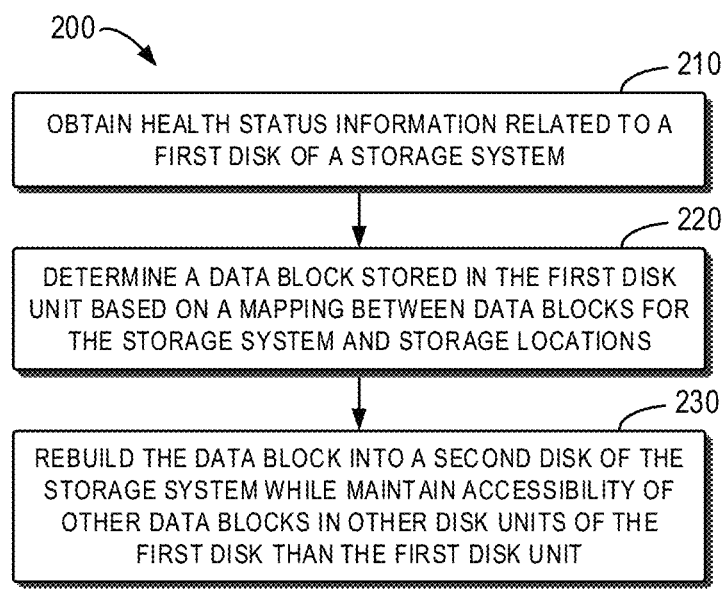
FIG. 2 illustrates a flowchart of a process of rebuilding data according to some embodiments of the present disclosure.

FIG. 2 illustrates a flowchart of a process 200 of rebuilding data according to some embodiments of the present disclose. The process 200 may be implemented by the system management module 102 in FIG. 1. For purpose of illustration, the process 200 will be described with reference to FIG. 1.

At block 210, the system management module 102 obtains health status information related to the first disk 120 of the storage system 100. As shown in FIG. 1, each disk in the storage system 100, including the first disk 120, is divided into a plurality of disk units 122. The health status information obtained by the system management module 102 indicates, at a disk unit level, failure situation of the plurality of disk unit 122. Specifically, the obtained health status information may indicate failure of a first disk unit in the first disk 120. The health status information may indicate failure of a plurality of first disk units in the first disk 120. The health status information may further indicate that other disk units in the first disk 120 are healthy.

The storage management module 102 or the disk 120 may include a disk detector for detecting the health status of the disk 120 per se. If one or more disk units 122 in a certain disk 120 have failed or will fail, the disk detector may determine or predict failure of these disk units 122, and report respective health status information to the system management module 102. Some current disks have the capability of reporting failure, for example, some disks can report health status information at disk unit level, such as a logical unit number (LUN) level. The health status information report at disk unit level has been specified in a small computer system interface (SCSI) protocol issued by storage networking industry association (SNIA).

In some embodiments, the health status information may be reported by disk firmware associated with the first disk 120. In some examples, the health status information may be provided only when it is detected that the failure/health status in the first disk 120 at the disk unit level is changed. In some other examples, the health status information may be provided to the system management module 102 in a predetermined cycle. In some other examples, which disk unit 122 is to fail or has failed is determined by performing full disk scan for each disk 120 in the system 100.

Since the obtained health status information indicates a failure of one or more first disk units in the first disks 120, the system management module 120 determines a data block stored in the first disk unit 122 based on a mapping between data blocks for the storage system 100 and storage locations, at block 220. The data block refers to a data unit stored in a disk unit, and the data unit as such is a basic unit for performing data rebuilding. For convenience of understanding the data block and the mapping between the data blocks and storage addresses, some data protection mechanisms frequently used in a storage system will be introduced briefly as below.

Figure 3A:
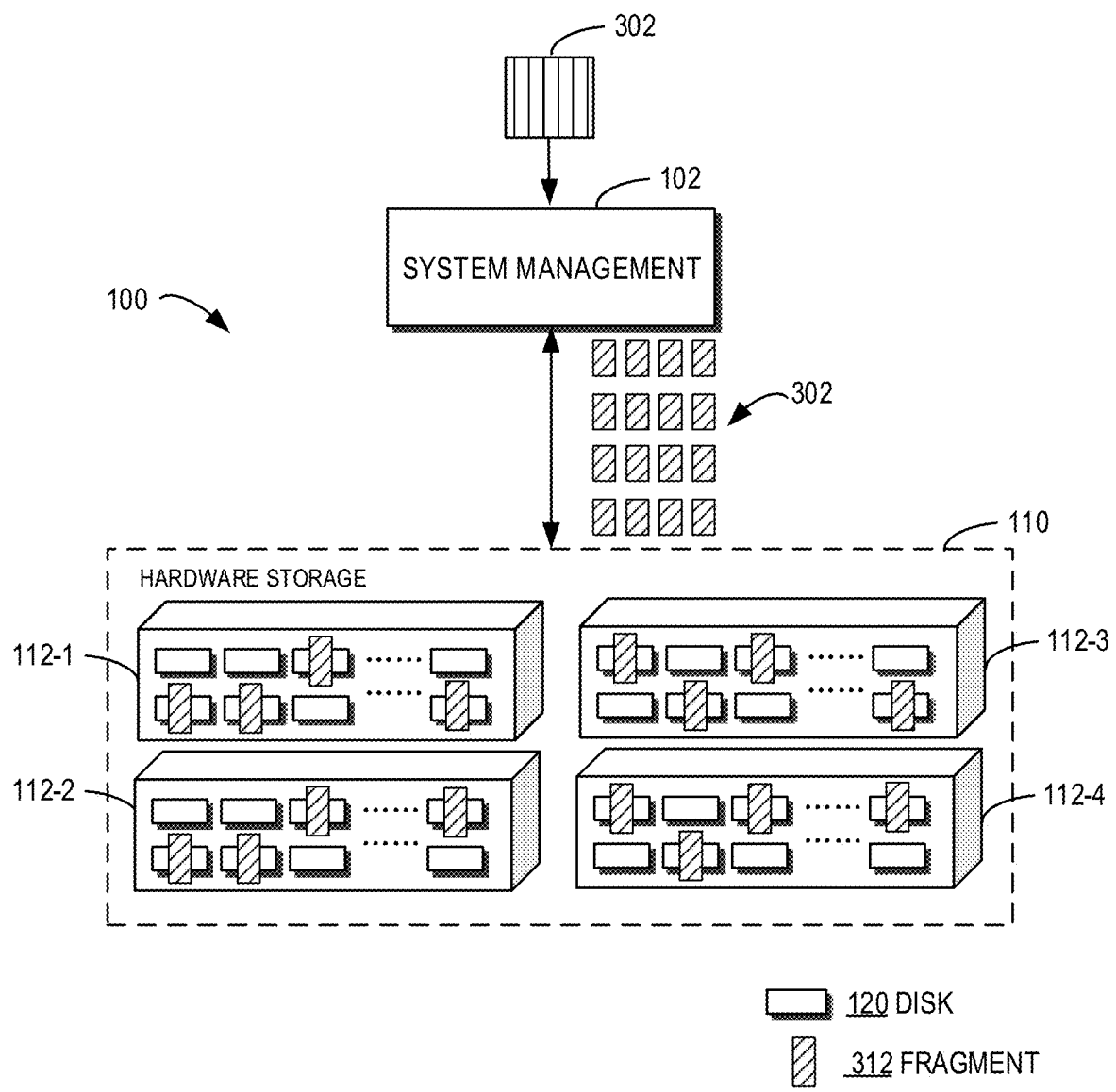
FIGS. 3A and 3B illustrate schematic diagrams of data protection mechanisms employed in a storage system according to some embodiments of the present disclosure.

FIG. 3A illustrates a data protection mechanism based on erasure coding. A data chunk 302 is a basic unit for the storage system 100 to perform data read/write. The system management module 102 divides the data chunk 302 into a plurality of data blocks 312. In the example in FIG. 3A, the data chunk 302 is divided into 16 fragments 312, including 12 data fragments and 4 code fragments. As shown in FIG. 3A, 16 fragments traversing physical nodes 122 are distributed over different disks 120. If a disk unit on a certain disk 120 fails, the fragment 312 stored on the disk will be lost or damaged. The system management module 102 may rebuild the lost or damaged fragment based on other data fragments 312 or code fragments 312. The solution based on erasure coding can tolerate loss of or damage to any four fragments in the data chunk 302, and can still implement data rebuilding from other fragments. In addition to being divided into 12 data fragments and 4 code fragments, the data chunk for performing data read/write may also be divided into other numbers of data fragments and code fragments, for example, 10 data fragments and 2 code fragments, and the like.

Figure 3B:
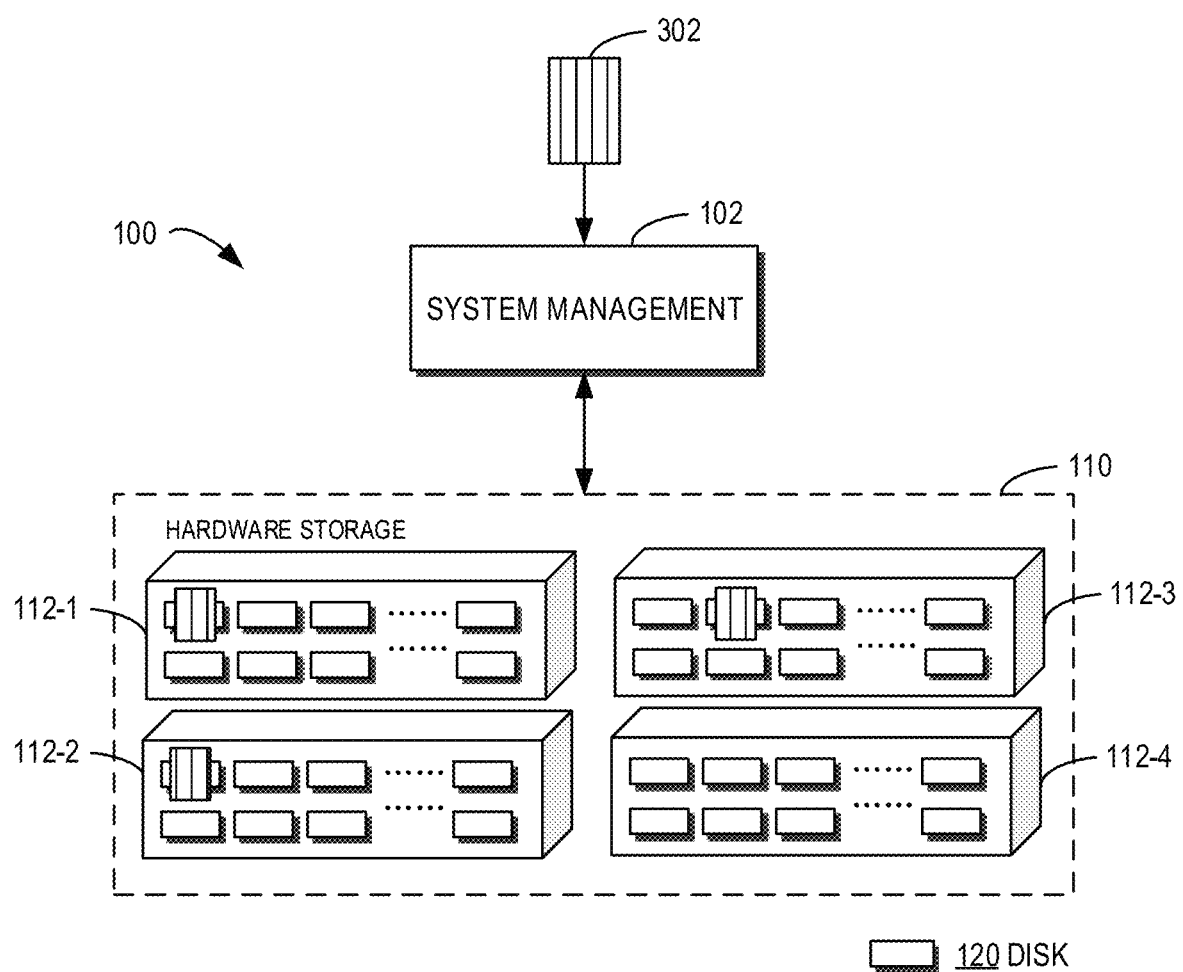

FIG. 3B illustrates a data protection mechanism based on a data copy. In the solution, the system management module 102 creates a plurality of copies of the data chunk 302, and stores these copies into the disks 120 on different physical nodes 112. In the example in FIG. 3B, the storage system 100 supports a triple mirror copy mode, thus the system management module 102 stores three copies of the data chunk 302 into disks 120 in physical nodes 112-1, 112-2 and 112-3, respectively. When a physical node or disk 120 having one copy of the data chunk 302 thereon fails, the system management module 102 may rebuild a new copy based on either of the remaining two copies.

FIGS. 3A and 3B illustrate two different kinds of protection mechanisms, respectively. In some cases, these two data protection mechanisms may be used in combination. For example, in the data protection mechanism based on data copies, each copy of the data chunk 302 may be divided into different fragments, and these fragments may be stored in different disks 120 of one physical node 112. In addition to the data protection mechanisms as shown in FIGS. 3A and 3B, the storage system 100 may also employ other data protection mechanisms.

As a basic unit for performing data rebuilding, the term "data block" herein may refer to a data fragment or a code fragment as shown in FIG. 3A, or a data chunk (or its copy) as shown in FIG. 3B. As described above, in order to perform rebuilding to the data block in the failed disk unit, the system management module 102 will utilize the mapping between the data blocks and the storage locations. The system management module 102 may maintain the mapping at the whole system level. The storage locations indicate locations of data blocks in the storage system, and for example, may be indicated by a physical node, a disk and a file where each data block is located, as well as an offset and a length of the data block. Based on the storage location, the data block may be positioned in the hardware storage portion 102 of the storage system 100. In one example, the system management module 102 may maintain a mapping table indicating the mapping of individual data blocks and storage addresses thereof. An example mapping table is provided in Table 1 below.

TABLE 1

Mapping between data blocks and storage locations

| Data block ID | Storage location |
| --- | --- |
| C1 | Node 1: Disk 1: File 1: Offset 1: Length |
| C2 | Node 1: Disk 1: File 2: Offset 2: Length |
| C3 | Node 1: Disk 2: File 1: Offset 3: Length |

In some examples, if a data block is a fragment in a data chunk (e.g. an example in FIG. 3A), a storage address may indicate a respective storage location of an individual fragment in each data chunk.

The storage management module 102 may determine a data block stored in the failed first disk unit 112 in the first disk 120 based on the mapping between data blocks and storage locations. Depending on the data storage distribution, the failed first disk unit 112 may store therein one or more data blocks.

Continuing to refer to FIG. 2, at block 230, the system management module 102 rebuilds the determined data block into a second disk 120 of the storage system 100, while maintaining accessibility of other data blocks in other disk units of the first disk 120 than the first disk unit 112.

The second disk 120 may be a disk including one or more healthy disk units 112 in the storage system 100. The determined data block may be rebuilt into the healthy disk units 112 in the second disk 120. In some embodiments, in order to avoid impacts caused by failure of a physical node, the second disk 120 may be a disk located on a different physical node than the first disk 120 does.

According to the data protection mechanism utilized by the storage system 100, the system management module 102 may employ different data rebuilding manners. In the data protection mechanism based on erasure coding, the data block and other data blocks (i.e., fragments) belong to the same data chunk, and these data blocks are stored in different disks 120 in the storage system 100, as shown in the example in FIG. 3A. The system management module 102 may rebuild the data block located on the failed disk unit into the second disk 120 with other data blocks. The data rebuilding process may recover specific data of a current data block.

In the data protection mechanism based on data copies, the data block (which is a data chunk, in the case) includes a copy stored in a further disk 120 (which is also referred to as the third disk) at other physical nodes 112. The system management module 102 may rebuild the data block into the second disk 120 with the copies; for example, a further copy may be created for storing into the second disk 120.

Figure 4A:
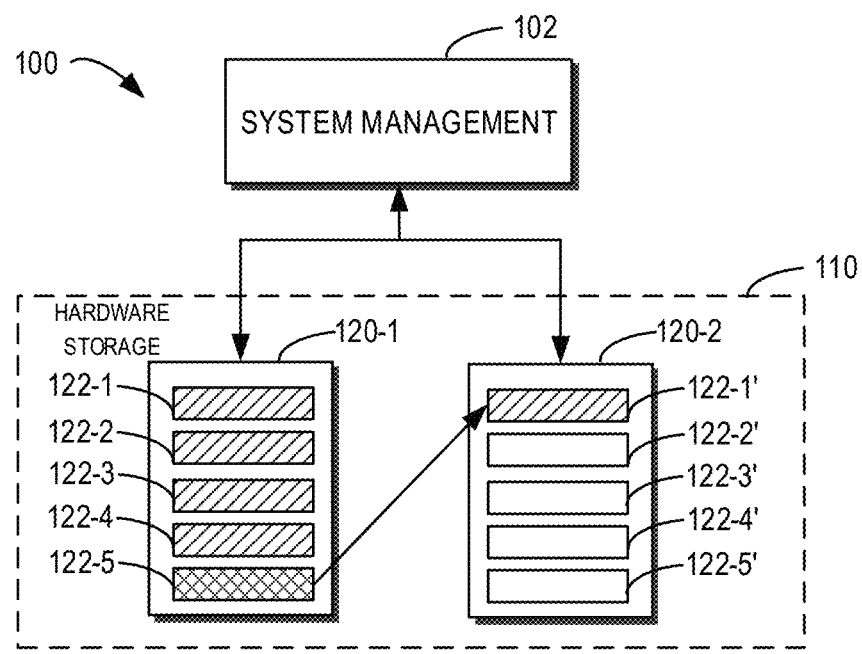
FIG. 4A illustrates a schematic diagram of data rebuilding in a storage system according to some embodiments of the present disclosure.

FIG. 4A illustrates data rebuilding from a failed unit of the first disk to the second disk. For purpose of illustration, in FIG. 4A, only two disks 120, representing disks 120-1 and 120-2 respectively, are shown in the hardware storage portion 110 of the storage system 100. For purpose of further illustration, it is assumed that the disk 120-1 includes five disk units 122-1 through 122-5, and the disk 120-2 includes five disk units 122-1' through 122-5'. Based on the health status information related to the disk 120-1, the system management module 102 determines that the disk unit 122-5 has a failure. The system management module 102 determines a data block stored in the disk unit 122-5 based on the mapping between data blocks and storage locations, and the determined data block is rebuilt into the disk 120-2, for example, the disk unit 122-1' of the disk 120-2.

In this process, the disk 120-1 is still an active disk in the storage system 100. Other healthy disk units 122-1 through 122-4 in the disk 120-1 still continue storing the previous data blocks, and these data blocks are still accessible in the disk 120-1, without requiring rebuilding.

According to embodiments of the present disclosure, only data stored on the failed disk unit is rebuilt while still keeping data in the healthy disk units accessible. Since data rebuilding is performed for the failed portion, rather than the entire disk 120, time, I/O access volume, computing resources, memory resources, network resources and the like, involved in the rebuilding process, can all be reduced. The saving of time and resources are particularly significant in a distributed data storage system having a large capacity. Since data block rebuilding is performed at system level, it is possible to avoid requirements on storage and computing resources in aspects of mapping storage and data rebuilding of an OS kernel on a single physical node. Further, the disk failed only partly may be used continuously, which is advantageous for saving disk hardware costs.

Figure 4B:
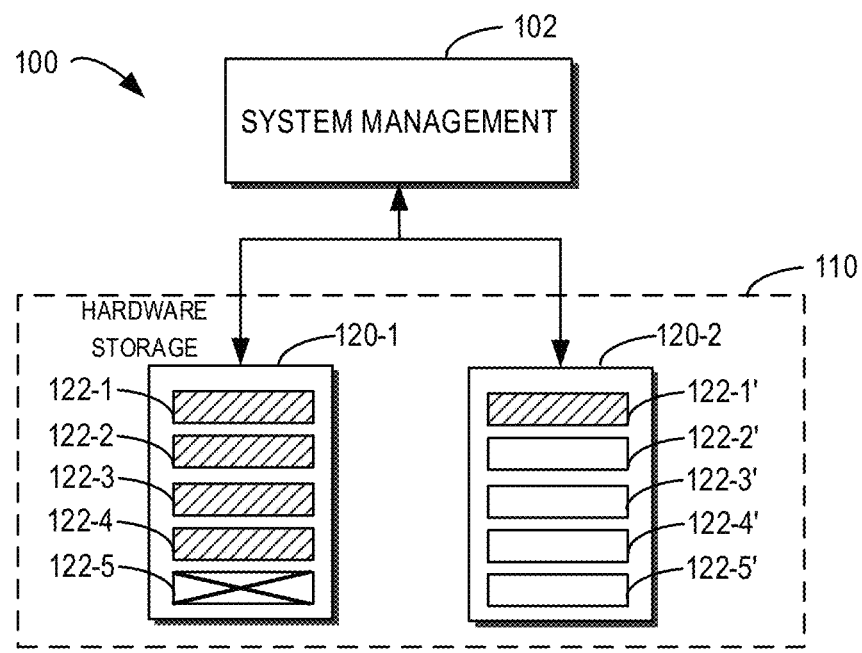
FIG. 4B illustrates a schematic diagram of marking a failed disk element in a storage system as inaccessible according to some embodiments of the present disclosure.

In some embodiments, the system management module 102 may also mark the failed first disk unit 122 in the first disk 120 as inaccessible (which is marked as dead disk unit, for example), so as to prevent the first disk unit 122 from being reallocated for storing data. As shown in FIG. 4B, after the data stored in the disk unit 122-5 in the disk 120-1 have been rebuilt into the disk unit 120-1' of the disk 120-2, the disk unit 122-5 is marked as inaccessible. If a plurality of the first disk units is failed, these failed disk units are not accessible any longer. Therefore, the system management module 102 will not perform any read/write access to the disk unit(s) 122 in the first disk 120 in the future.

As a result, online data extraction for the first disk 120 is implemented. In the storage system 100, the first disk 120 is still kept online, while the failed disk unit will be no longer in use. In a subsequent operation, the first disk 120 is exhibited as a disk having a smaller storage capacity.

It would be appreciated that data rebuilding performed when one or more failed units are stored in a single disk have been described above. If the health status information obtained in the system management module 102 indicates that a plurality of disks 120 in the storage system 100 include failed disk units, the system management module 102 may perform similar data rebuilding for failed disk units in respective disks.

Figure 5:
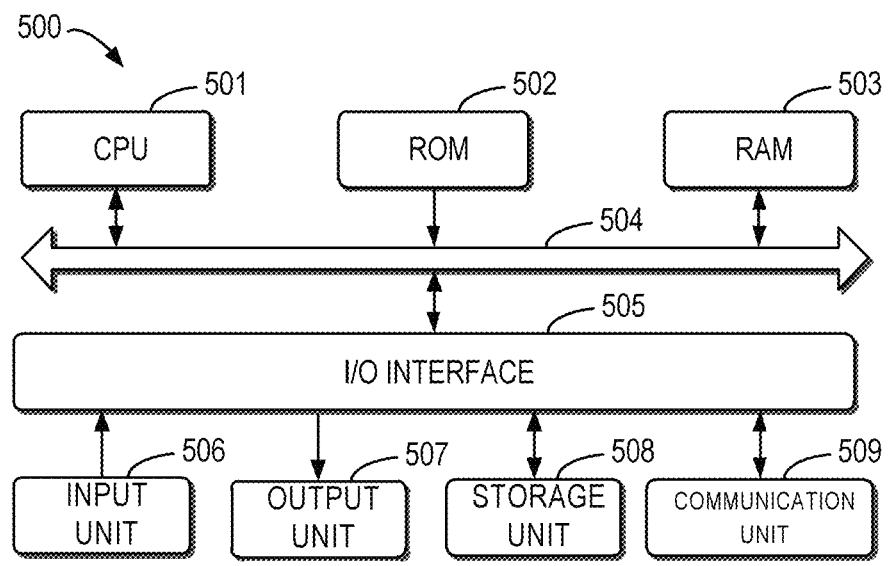
FIG. 5 illustrates a block diagram of an example device that can be used to implement embodiments of the present disclosure.

FIG. 5 illustrates a schematic block diagram of an example device 500 that may be used to implement the embodiments of the present disclosure. The device 500 may be implemented as a system management module 102 in FIG. 1. The device 500 may be used to implement the process 200 in FIG. 2.

As shown, the device 500 includes a central process unit (CPU) 501, which may perform various suitable acts and processing based on computer program instructions stored in a read-only memory (ROM) 502 or computer program instructions loaded into a random-access memory (RAM) 503 from a storage unit 508. The RAM 503 may also store all kinds of programs and data required by the operations of the device 500. The CPU 501, the ROM 502 and the RAM 503 are connected to each other via a bus 504. An input/output (I/O) interface 505 is also connected to the bus 504.

A plurality of components in the device 500 is connected to the I/O interface 505, including: an input unit 506, for example, a keyboard, a mouse and the like; an output unit 507, for example, various kinds of displays and loudspeakers etc.; a storage unit 508, for example, a disk and an optical disk etc.; and a communication unit 509, for example, a network card, a modem, a wireless transceiver and the like. The communication unit 509 allows the device 500 to exchange information/data with other devices via a computer network, such as Internet, and/or various telecommunication networks.

Each method and process described above, for example, the process 300 and/or the process 400. For example, in some embodiments, the process 300 and/or the process 400 may be implemented as a computer software program or a computer program product tangibly included in the machine-readable medium, such as a non-transient computer readable medium, such as, the storage unit 508. In some embodiments, the computer program can be partially or fully loaded and/or mounted to the device 500 via the ROM 502 and/or the communication unit 509. When the computer program is loaded to the RAM 503 and executed by the CPU 501, one or more steps of the above described process 300 and/or process 400 may be implemented. Alternatively, in other embodiments, the CPU 501 may be configured via any other suitable manners (e.g., by means of firmware) to execute the process 300 and/or process 400.

Those skilled in the art would understand that various steps of the method of the present disclosure above may be implemented via a general purpose computing apparatus, which may be integrated on a single computing device or distributed over a network composed of a plurality of computing apparatuses. Optionally, they may be implemented using program code executable by the computing apparatus, such that they may be stored in a storage device and executed by the computing device; or they may be made into respective integrated circuit modules or a plurality of modules or steps therein may be made into a single integrated circuit module for implementation. In this way, the present disclosure is not limited to any specific combination of hardware and software.

It would be appreciated that although several means or sub-means of the device (e.g., specialized circuitry) have been mentioned in detailed description above, such division is only example but not limitation. Actually, according to the embodiments of the present disclosure, features and functions of two or more apparatuses described above may be instantiated in one apparatus. In turn, features and functions of one apparatus described above may be further divided to be instantiated by various apparatuses.

What have been mentioned above are only some optional embodiments of the present disclosure and are not limiting the present disclosure. For those skilled in the art, the present disclosure may have various alternations and changes. Any modifications, equivalents and improvements made within the spirits and principles of the present disclosure should be included within the scope of the present disclosure.

We claim:

1. A method of rebuilding data, comprising:
    obtaining health status information related to a first disk of a storage system, wherein the first disk comprises a solid state disk having multiple channels, the first disk being divided into a plurality of disk units, wherein each one of the plurality of disk units corresponds to a different one of the multiple channels of the solid state disk, and the health status information indicating a failure of a first disk unit of the plurality of disk units;
    determining a data block stored in the first disk unit based on a mapping between data blocks for the storage system and storage locations; and
    rebuilding the data block into a second disk of the storage system, while maintaining accessibility of other data blocks in other disk units of the first disk than the first disk unit.

2. The method of claim 1, further comprising:
    marking the first disk unit as inaccessible so as to prevent the first disk unit from being reallocated for storing data.

3. The method of claim 1, wherein the storage system comprises a distribution storage system.

4. The method of claim 3, wherein the first and second disks are located at different physical nodes of the distribution storage system.

5. The method of claim 1, wherein a copy of the data block is stored in a third disk of the plurality of disks, the first and third disks being distributed at different physical nodes, and wherein rebuilding the data block into the second disk comprises:
    rebuilding the data block into the second disk with the copy.

6. The method of claim 1, wherein the data block and a plurality of further data blocks are comprised in a data chunk, the plurality of further data blocks being stored in further disks different from the first disk in the storage system, and wherein rebuilding the data block into the second disk comprising:
    rebuilding the data block into the second disk with the plurality of further data blocks.

7. The method of claim 1, wherein obtaining the health status information comprises:
    receiving the health status information from disk firmware associated with the first disk.

8. The method of claim 1, wherein the availability of the other data blocks of other disk units of the first disk is maintained simultaneously with the rebuilding of the data block into the second disk of the storage system without making the first disk offline.

9. The method of claim 1, wherein the health status information further indicates that the disk units of the first disk other than the first disk unit are healthy.

10. An electronic device, comprising:
    a processor; and
    a memory coupled to the processor and having instructions stored therein, the instructions, when executed by the processor, causing the device to perform acts including:
        obtaining health status information related to a first disk of a storage system, wherein the first disk comprises a solid state disk having multiple channels, the first disk being divided into a plurality of disk units, wherein each one of the plurality of disk units corresponds to a different one of the multiple channels of the solid state disk, and the health status information indicating a failure of a first disk unit of the plurality of disk units;
        determining a data block stored in the first disk unit based on a mapping between data blocks for the storage system and storage locations; and rebuilding the data block into a second disk of the storage system, while maintaining accessibility of other data blocks in other disk units of the first disk than the first disk unit.

11. The device of claim 10, wherein the acts further comprise:
marking the first disk unit as inaccessible so as to prevent the first disk unit from being reallocated for storing data.

12. The device of claim 10, wherein the storage system comprises a distribution storage system.

13. The device of claim 12, wherein the first and second disks are located at different physical nodes of the distribution storage system.

14. The device of claim 10, wherein a copy of the data block is stored in a third disk of the plurality of disks, the first and third disks being distributed at different physical nodes, and wherein rebuilding the data block into the second disk includes:
rebuilding the data block into the second disk with the copy.

15. The device of claim 10, wherein the data block and a plurality of further data blocks are comprised in a data chunk, the plurality of further data blocks being stored in further disks different from the first disk in the storage system, and wherein rebuilding the data block into the second disk includes:
rebuilding the data block into the second disk using the plurality of further data blocks.

16. The device of claim 7, wherein obtaining the health status information comprises:
receiving the health status information from disk firmware associated with the first disk.

17. A computer program product having a non-transitory computer readable medium which stores a set of instructions that, when carried out by a computerized device, causes the computerized device to:
obtain health status information related to a first disk of a storage system, wherein the first disk comprises a solid state disk having multiple channels, the first disk being divided into a plurality of disk units, wherein each one of the plurality of disk units corresponds to a different one of the multiple channels of the solid state disk, and the health status information indicating a failure of a first disk unit of the plurality of disk units;
determine a data block stored in the first disk unit based on a mapping between data blocks for the storage system and storage locations; and
rebuild the data block into a second disk of the storage system, while maintaining accessibility of other data blocks in other disk units of the first disk than the first disk unit.

18. The computer program product of claim 17, wherein the computer executable instructions, when executed, further cause the device to:
mark the first disk unit as inaccessible so as to prevent the first disk unit from being reallocated for storing data.

19. The computer program product of claim 17, wherein the storage system includes a distribution storage system.

20. The computer program product of claim 19, wherein the first and second disks are located at different physical nodes of the distribution storage system.

21. The computer program product of claim 17, wherein a copy of the data block is stored in a third disk of the plurality of disks, the first and third disks being distributed at different physical nodes, and wherein the computer executable instructions, when executed, further cause the device to:
rebuild the data block into the second disk with the copy.

22. The computer program product of claim 17, wherein the data block and a plurality of further data blocks are comprised in a data chunk, the plurality of further data blocks being stored in further disks different from the first disk in the storage system, and wherein the computer executable instructions, when executed, further cause the device to:
rebuild the data block into the second disk with the plurality of further data blocks.

23. The computer program product of claim 17, wherein the computer executable instructions, when executed, further cause the device to:
receive the health status information from disk firmware associated with the first disk.

* * * * *